US007363693B2

(12) United States Patent
Fischer

(10) Patent No.: US 7,363,693 B2
(45) Date of Patent: Apr. 29, 2008

(54) WIRE-PROCESSING DEVICE

(75) Inventor: Daniel Fischer, Luzern (CH)

(73) Assignee: Komax Holding AG, Dierikon (CH)

( * ) Notice: Subject to any disclaimer, the term of this patent is extended or adjusted under 35 U.S.C. 154(b) by 402 days.

(21) Appl. No.: 11/014,267

(22) Filed: Dec. 16, 2004

(65) Prior Publication Data

US 2005/0133562 A1 Jun. 23, 2005

(30) Foreign Application Priority Data

Dec. 22, 2003 (EP) ................................ 03405914

(51) Int. Cl.
*B23P 23/00* (2006.01)
*B23Q 3/157* (2006.01)

(52) U.S. Cl. .................... 29/564.4; 29/564.6; 483/901

(58) Field of Classification Search ............... 29/564.4, 29/564.6, 33 M, 33 F, 745, 746, 747, 748, 29/749, 868; 901/30, 31; 483/7, 16, 41, 483/34, 58, 60, 65, 901, 902; 226/24; 72/428
See application file for complete search history.

(56) References Cited

U.S. PATENT DOCUMENTS 2,572,312 A * 10/1951 Burge et al. ............... 29/25.42
3,580,418 A * 5/1971 Werkmeister et al. ...... 221/275
3,616,534 A * 11/1971 Lugger ........................ 29/845
3,731,821 A * 5/1973 Wallis ..................... 414/753.1
3,969,807 A * 7/1976 Takizawa et al. .......... 29/564.6
4,320,876 A * 3/1982 Parham et al. ........... 242/437.2
4,387,745 A * 6/1983 Brown .......................... 72/66
4,449,293 A * 5/1984 Itoh et al. ...................... 29/736
4,490,904 A * 1/1985 Moyher ........................ 29/864
4,557,165 A * 12/1985 Werkmeister et al. ........ 82/126
4,720,898 A * 1/1988 Calfo et al. ................. 29/33 K
4,723,353 A * 2/1988 Monforte ..................... 483/10
4,800,645 A * 1/1989 Limongelli et al. ........... 483/60
4,817,256 A * 4/1989 Riti et al. ................... 29/33 L
4,883,939 A * 11/1989 Sagi ........................... 483/901
4,894,908 A * 1/1990 Haba et al. ................... 29/711
4,918,809 A * 4/1990 Steinhilber ................... 29/792
5,188,213 A * 2/1993 Koch ...................... 198/470.1
5,456,635 A * 10/1995 Monacelli .................... 470/40
5,878,489 A * 3/1999 Shioda et al. ................ 29/857

(Continued)

FOREIGN PATENT DOCUMENTS

DE 2 254 784 5/1973

(Continued)

*Primary Examiner*—Dana Ross
(74) *Attorney, Agent, or Firm*—Fraser Clemens Martin & Miller LLC; William J. Clemens

(57) ABSTRACT

A wire-processing device has a belt-drive that feeds a wire to a swivel-arm with a gripper. Drives operate the swivel-arm in a swiveling motion and/or in a linear motion. The swivel-arm has a neutral position on a longitudinal axis of the wire and on the axis is a processing station with a cutting-head that cuts off the leading end and strips the insulation of a wire-end being held by the gripper and a guide-tube arranged on the gripper. An internal diameter of the guide-tube fits onto an external diameter of the wire. Other guide-tubes with different internal diameters are stored in a magazine with the swivel-arm being able to execute a change of guide-tubes automatically.

8 Claims, 5 Drawing Sheets

U.S. PATENT DOCUMENTS

| | | | | |
|---|---|---|---|---|
| 6,154,949 | A | 12/2000 | Hasegawa | 29/564.4 |
| 6,903,305 | B2 * | 6/2005 | Mukai et al. | 219/137.7 |
| 2004/0011776 | A1 * | 1/2004 | Mukai et al. | 219/137.71 |
| 2004/0158976 | A1 | 8/2004 | Conte | 29/742 |

FOREIGN PATENT DOCUMENTS

| | | |
|---|---|---|
| EP | 1 032 095 | 8/2000 |

* cited by examiner

WIRE-PROCESSING DEVICE

BACKGROUND OF THE INVENTION

The present invention relates to a wire-processing device with processing stations for processing a wire, and having at least one feeder with a guide-tube to feed the wire to the processing stations.

Usually, the processing stations of a wire-processing device are arranged in a circle, a swivel-arm feeding the wire-ends to the processing stations for processing (cutting, insulation-stripping, crimping, sleeving, etc.). The wire-ends must be fed to the processing stations accurately, both in the direction of the length of the wire and in the radial direction. Before cutting and insulation-stripping take place, the gripper of the swivel-arm grips the wire. Therefore, provided that the wire-end is guided accurately in a guide-tube of the gripper, the feeding accuracy depends only on the positioning accuracy of the swivel-arm drive. The internal diameter of the guide-tube must be adapted to the cross-section of the wire in such manner that the wire-end in the guide-tube can only move in the longitudinal axis of the wire. Depending on the cross-section of the wire which is to be processed, a corresponding guide-tube must be used, so that the wire-end cannot execute unexpected movements relative to the guide-tube.

When changing from one wire cross-section to another wire cross-section, the guide-tube of the gripper which was previously used must be removed manually, and a new guide-tube which is adapted to the new cross-section must be mounted manually.

A disadvantage of this known device is that incorrect manipulation when manually changing the guide-tube presents an accident hazard to the operator. Uncontrolled movements of the swivel-arm or gripper can cause the operator to trap and injure his fingers, at the least.

SUMMARY OF THE INVENTION

The present invention provides a solution to avoiding the disadvantages of the known device and creates a wire-processing device with short retooling times.

The advantages achieved by the present invention are that, at batch changes with different wire cross-sections, the operator need not remember, or be reminded, to change the guide-tube. Relative to manual changing of the guide-tube, automated or automatic changing of the guide-tube can be executed substantially faster, and thereby shorten the retooling times of the wire processing device, which especially in the case of small batch sizes with different cross-sections of wire, is of great economic significance.

The control system of the wire-processing device knows the data of, for example, the external diameter of the wire to be processed, and can select the optimal guide-tube automatically based on this data. With automatic changing of the guide-tube, possible confusion of guide-tubes through error of the operator when changing the guide-tube manually is ruled out. Furthermore, optimal guidance of the wire-end also results in a consistently uniform high quality of the processed wire-end.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
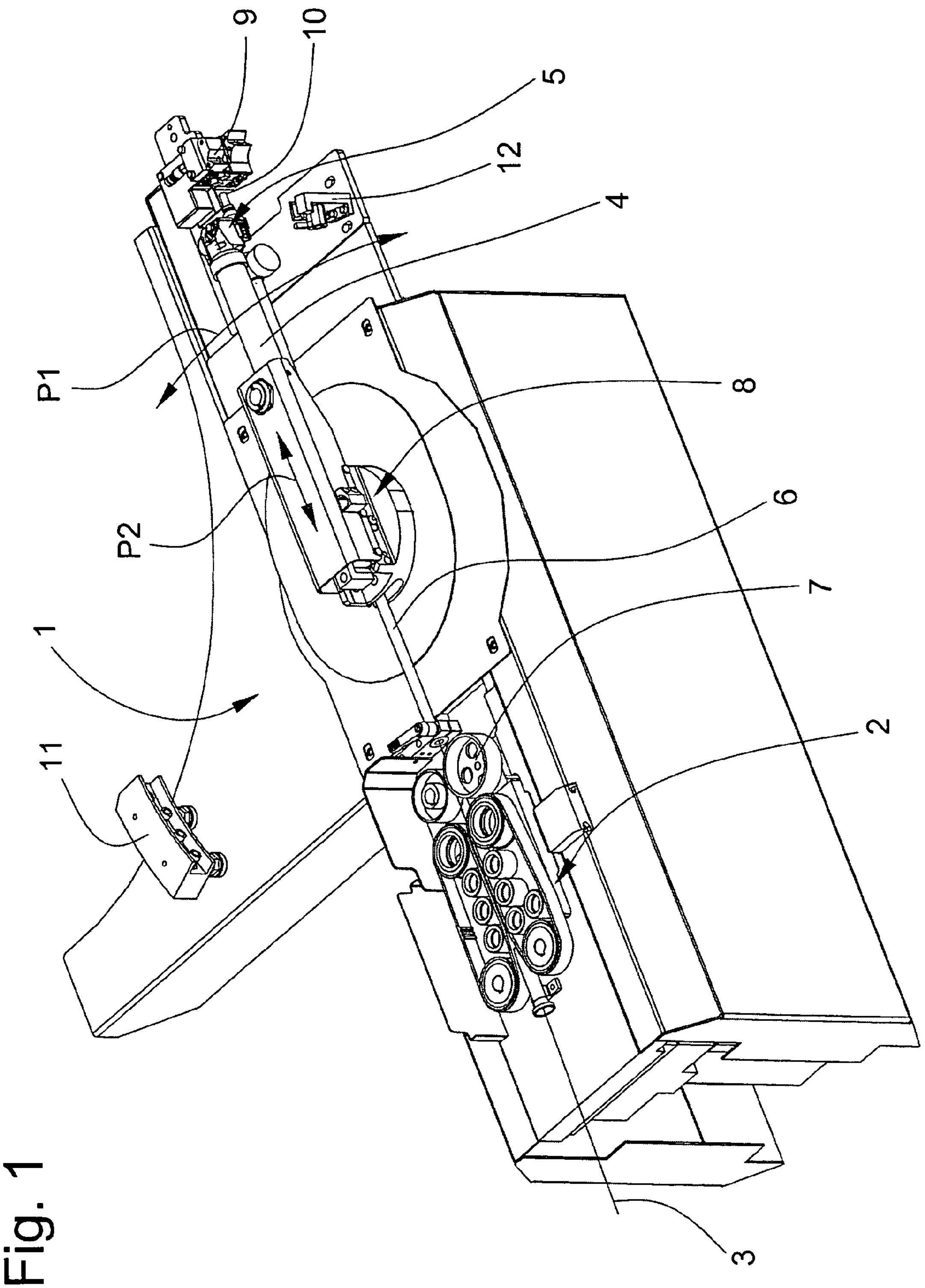
FIG. 1 is a schematic perspective view of a wire-processing device according to the present invention.

FIG. 1 shows a wire-processing device 1 with a wire-advancer executed as a belt-drive 2, the belt-drive 2 feeding a wire 3 to a swivel-arm 4 with gripper 5. The wire 3 is guided in a flexible tube 6, the advanced length of wire being measurable by means of an encoder 7 of the belt-drive 2. By means of drives 8, the swivel-arm 4 can be set into a swiveling motion symbolized by an arrow P1, and/or into a linear motion symbolized by an arrow P2. Details of the drives 8 and the swivel-arm 4 with gripper 5 are explained in European patent application EP 03405094.8, corresponding to co-pending U.S. patent application Ser. No. 10/775,607 incorporated herein by reference.

The swivel-arm 4 is shown in the neutral position on a longitudinal axis of the wire 3 in which, for example, a processing station with a cutting head 9 is arranged which cuts off the leading end, and strips the insulation, of a wire-end 3.1 (FIG. 2), the wire-end 3.1 being held by means of the gripper 5 and a guide-tube 10 arranged on the gripper 5. The internal diameter of the guide-tube 10 fits onto the external diameter of the wire 3. Further guide-tubes 10 with different internal diameters are stored in a magazine 11, the magazine 11 being arranged along the path of the swivel-arm outside the working area and outside the feeding area. Also provided along the path of the swivel-arm 4 as a threading aid in the gripper area is a stationary wire-guide 12 which can be approached by the swivel-arm 4 and serves to thread the wire 3 into the guide-tube 10 of the gripper 5.

Figure 2:
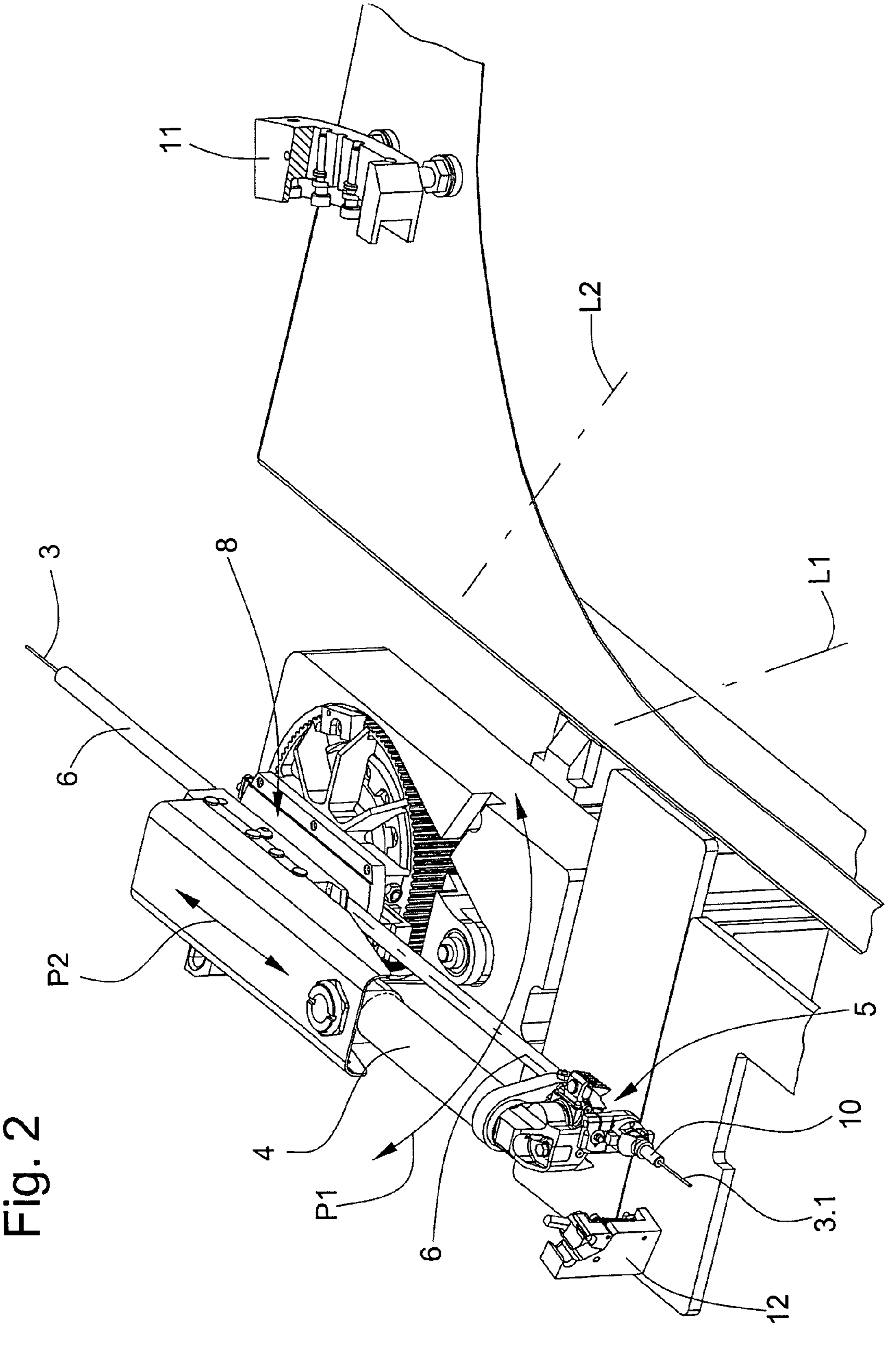
FIG. 2 is a schematic perspective view a feeder with a swivel-arm, a gripper, and a guide-tube of the wire-processing device shown in FIG. 1.

FIG. 2 shows the swivel-arm 4 with the gripper 5 and the guide-tube 10. The swivel-arm 4 with the gripper 5 and the guide-tube 10 serves as a feeder for feeding wire-ends 3.1 to processing stations. L1 designates a position of the swivel-arm 4 in which the wire-end 3.1, from which the leading end has been cut off and the insulation stripped, is fed to, for example, a sleeving station, the sleeving station mounting a sleeve on the wire-end 3.1. L2 designates a position of the swivel-arm 4 in which the wire-end 3.1 with the sleeve is fed to, for example, a crimping station, the crimping station fastening a crimped contact onto the wire-end 3.1. The magazine 11, which is arranged along the path of the swivel-arm 4 outside the working area and outside the feeding area, is shown cut open with the further guide-tubes 10. Several magazines 11 with the guide-tubes 10 can also be provided along the path of the swivel-arm.

Figure 3:
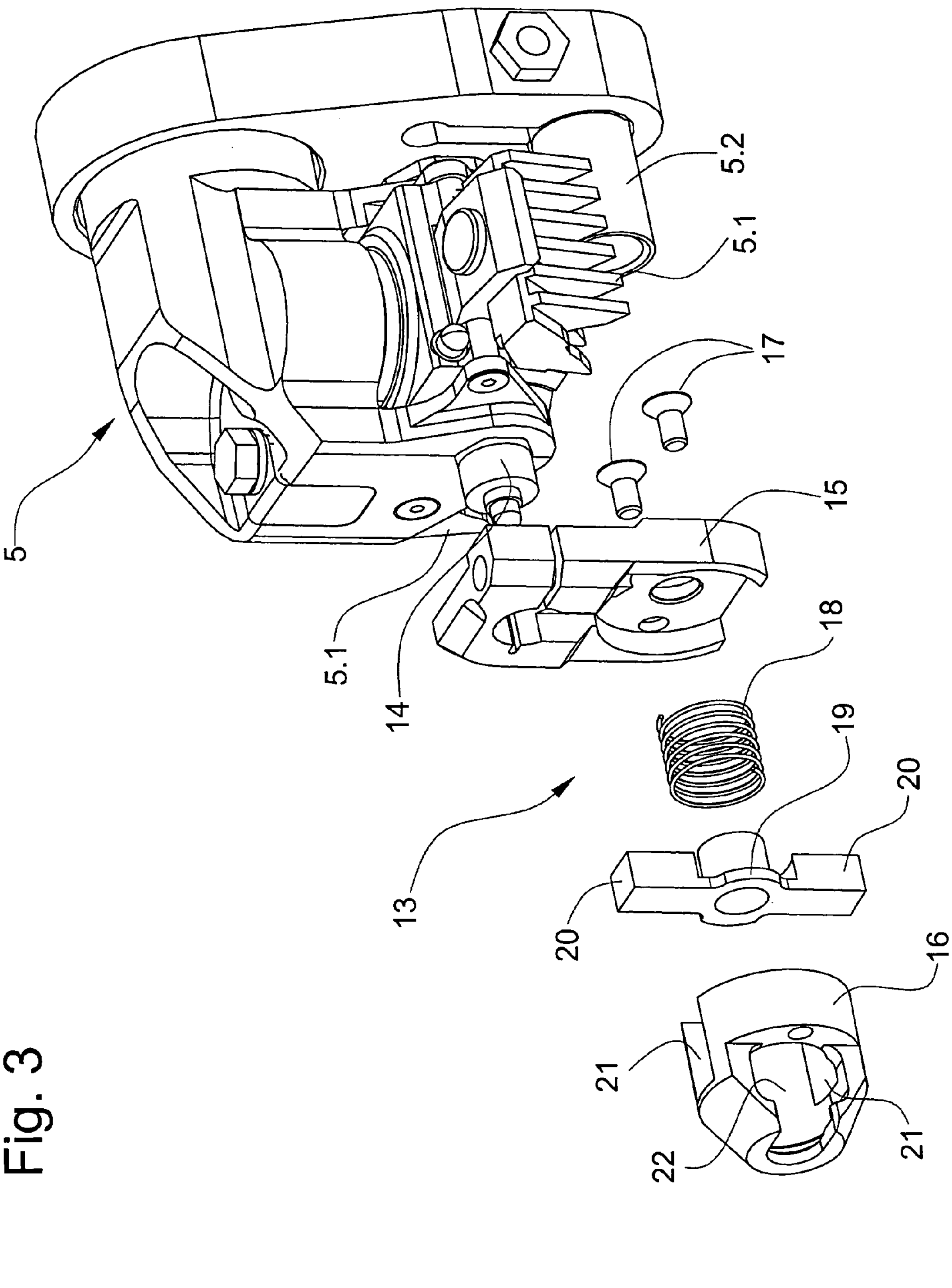
FIG. 3 is an enlarged schematic exploded view of the holder for the guide-tube shown in FIG. 2.

FIG. 3 shows a holder 13 for holding the guide-tube 10 firmly on the gripper 5. The holder 13 is provided for tool-less guide-tube changing. Arranged on a pin 14 of the gripper 5 is a housing 15 which serves as support for a holding-head 16, a pair of screws 17 holding the head 16 firmly. Pressing against the housing 15 is a compression spring 18 which imparts a spring force to a pressure-piece 19. Arms 20 of the pressure-piece 19 slide in grooves 21 of the holding-head 16 and are actuated when changing the guide-tubes 10. The gripper 5 is shown with open gripper-jaws 5.1. By means of the belt-drive 2, the wire 3 is advanced through the flexible tube 6 into a pipe 5.2 arranged on the gripper 5, and from this into the guide-tube 10 (FIG. 2) clamped onto the head 16, the wire-guide 12 between the pipe 5.2 and holder 13 serving as a threading aid when the gripper-jaws 5.1 are open.

Figure 4:
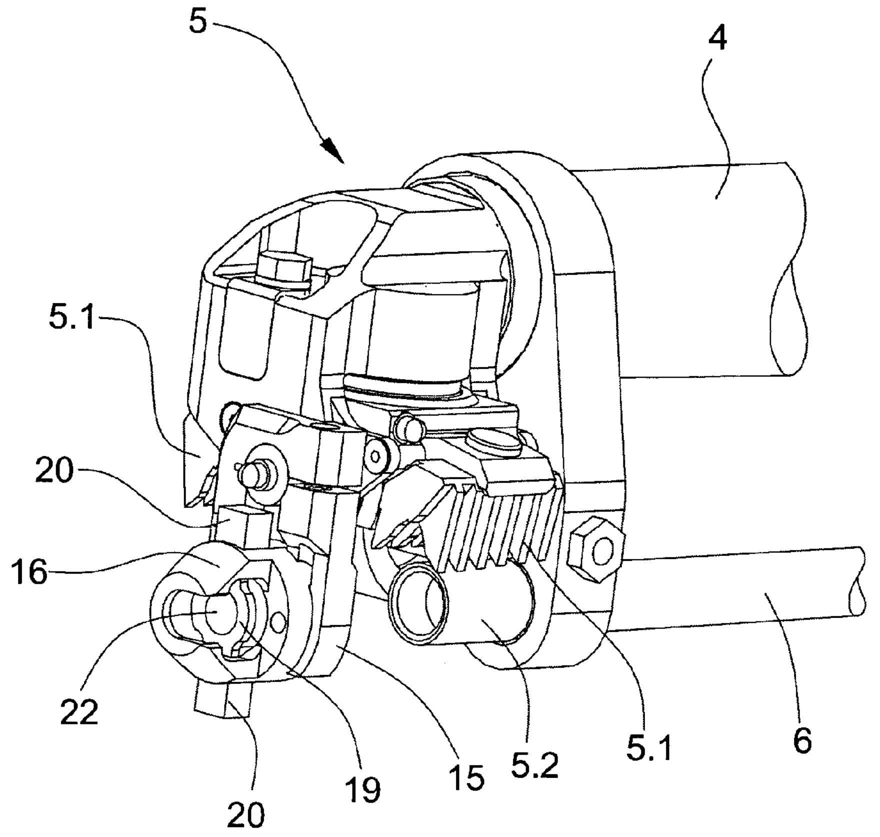
FIG. 4 is a schematic perspective view of the assembled holder shown in FIG. 3.
Figure 5:
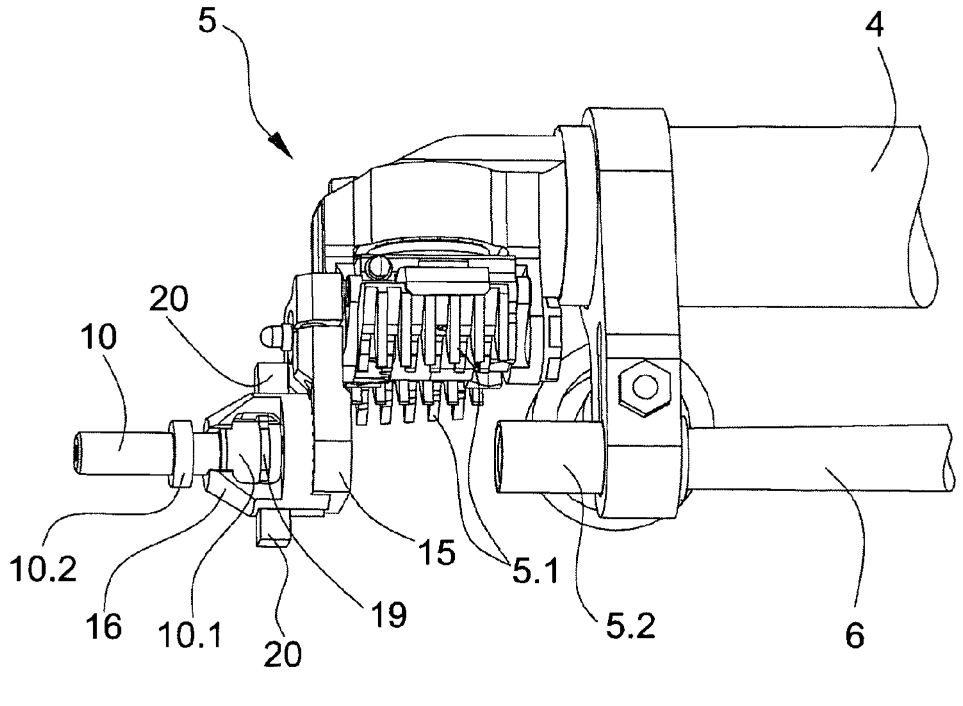
FIG. 5 is a schematic perspective view of the holder with the guide-tube shown in FIG. 2.

FIG. 4 shows the assembled holder 13, and FIG. 5 shows the holder 13 with the guide-tube 10 which can be inserted through an opening 22 in a side of the holding-head 16, the guide-tube 10 being held firmly in the holding-head 16 by the effect of the spring-pressure on the pressure-piece 19.

Figure 6:
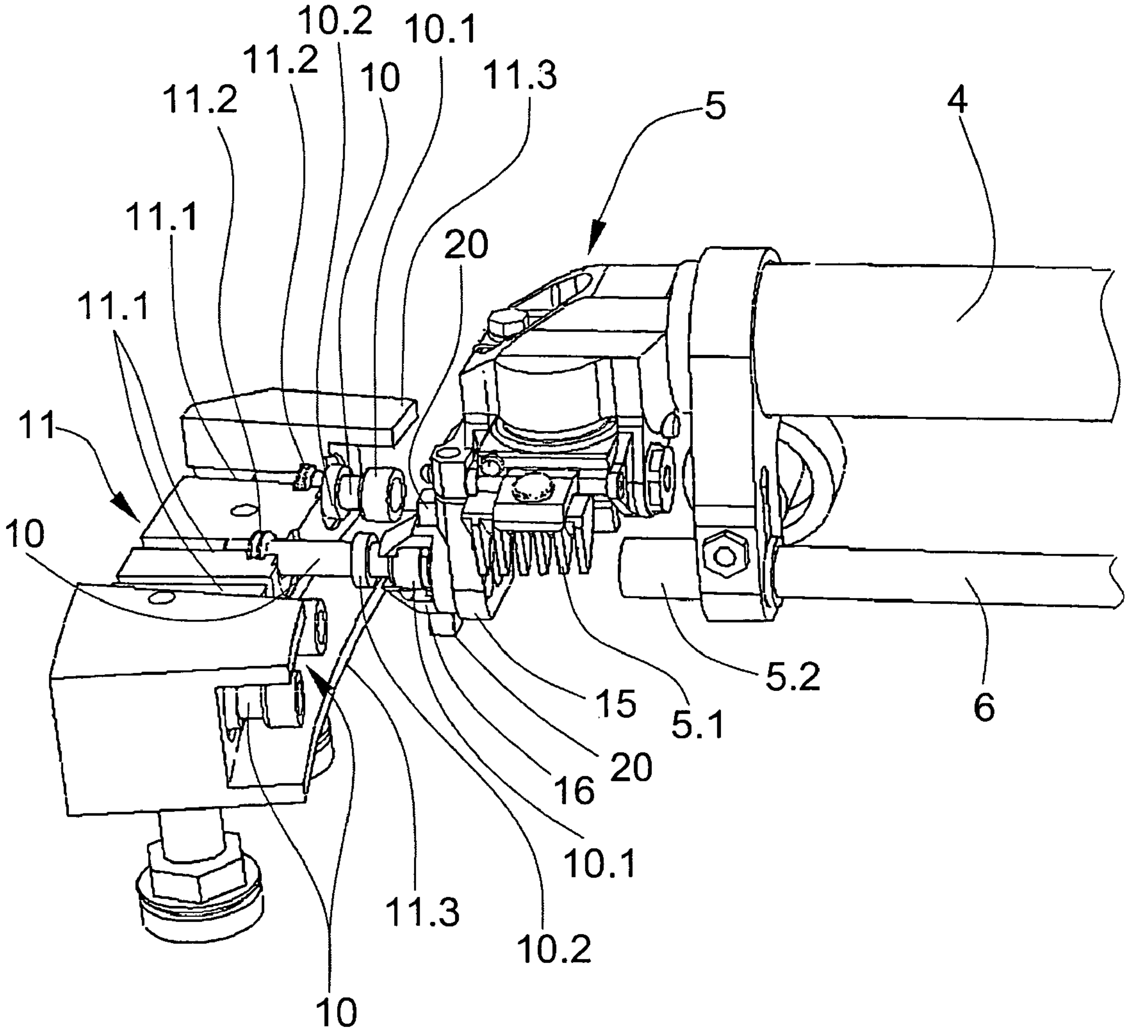
FIG. 6 is a fragmentary schematic perspective view of the swivel-arm shown in FIG. 2 when changing the guide-tube.

FIG. 6 shows the swivel-arm 4 when changing guide-tubes, a selected one of the guide-tubes 10 being removed from the magazine 11 which is shown cut open. A control system of the wire-processing device 1 and the swivel-arm 4 knows the position of the selected guide-tube 10 which is to be removed from the magazine 11. The swivel-arm 4 moves the opening 22 of the holding-head 16 near to a tube-head 10.1 of the selected guide-tube 10 to be removed, the arms 20 of the pressure-piece 19 being actuated by means of edges 11.3 of the magazine 11. The pressure-piece 19 is thereby pushed back against the spring-force of the compression spring 18. The swivel-arm 4 then executes a swiveling motion, whereby the tube-head 10.1 is inserted through the opening 22 into the holding-head 16. The swivel-arm 4 then executes a linear withdrawal motion, whereby the tube-head 10.1 is held firmly in the holding-head 16 by the effect of the spring-pressure on the pressure-piece 19. The withdrawal motion is continued until the guide-tube 10 is completely withdrawn from a storage-compartment 11.1 of the magazine 11. When replacing the guide-tube 10 into the storage-compartment, the steps are executed analogously in the reverse sequence. The guide-tube 10 is inserted into the cylinder-shaped storage-compartment 11.1 until the arms 20 are actuated by means of the edges 11.3, and further until a stop 10.2 of the guide-tube 10 touches the wall of the magazine, whereby the tube-head 10.1 in the holding-head 16 is released and, by means of a swiveling motion of the swivel-arm 4, removed from the holding-head 16. The guide-tube 10 is held fast in the storage-compartment 11.1 by means of, for example, an O-ring 11.2.

The magazine 11 with the guide-tubes 10 can also be arranged within the working area and within the feeding area of the swivel-arm 4, for example between two processing stations. So that no collisions can occur, in this variant embodiment the magazine 11 is, for example, movable upward and downward. When changing the guide-tubes 10, the magazine 11 is moved upward and is reachable by the swivel-arm 4. After changing the guide-tubes 10, the magazine 11 is moved downward and is then outside the swivel-arm path.

The device according to the present invention can also be provided on wire-processing devices with several swivel-arms, there being provided for each swivel-arm at least one magazine with a stock of guide-tubes and a wire guide.

The device according to the present invention can also be used, for example, on wire-processing devices with linear wire-feeding. On such devices the magazine with the guide-tubes, and the wire guide, are arranged at one end and the other end outside the working area and outside the feeding area of the device which feeds the wire-ends, the feeder being able to execute the change of guide-tubes automatically as explained above.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A wire-processing device with processing stations for processing a wire comprises:

a feeder for releasably holding a guide-tube while feeding the wire to the processing stations; and a magazine releasably holding at least two guide-tubes having different internal diameters, said feeder being movable relative to said magazine for removing a selected one of said guide-tubes from said magazine and for inserting said selected one guide-tube into said magazine, said feeder feeding the wire to the processing stations while releasably holding said selected one guide-tube.

2. The wire-processing device according to claim 1 wherein said feeder includes a holder having a holder-head for releasably retaining said selected one guide-tube for automatically executing a change of said selected one guide-tube for another one of said at least two guide-tubes.

3. The wire-processing device according to claim 2 wherein said holder includes a spring-loaded pressure-piece for holding said selected one guide-tube firmly in said holding-head, a tube-head of said selected one guide-tube being insertable into said holding-head through an opening in said holding-head, and said tube-head having pressure applied thereto by said pressure-piece.

4. The wire-processing device according to claim 3 including at least one arm on said pressure-piece actuated by an edge of said magazine, said pressure-piece being movable by said actuation out of said holding-head against a spring-force of a compression spring of said holder.

5. The wire-processing device according to claim 1 wherein each of said at least two guide-tubes is releasably held in an associated storage compartment of said magazine.

6. A method for processing a wire in which a feeder with a guide-tube feeds the wire to a processing station of a wire-processing device, comprising the steps of:

a. providing at least one magazine reachable by the feeder and having at least two storage-compartments;

b. providing at least two guide-tubes having different internal diameters corresponding to different external diameters of wires to be processed;

c. releasably retaining each of the guide-tubes in an associated one of the storage-compartments for removal by the feeder; and d. feeding the wire to the processing station through one of the guide-tubes removed and being held by the feeder.

7. The method according to claim 6 including selecting one of the guide-tubes corresponding to the wire to be processed, moving the feeder to a one of the storage-compartments associated with the selected guide-tube and operating the feeder to remove the selected guide-tube from the magazine.

8. The method according to claim 7 including moving the feeder with the selected guide-tube to the storage-compartments associated with the selected guide-tube and operating the feeder to insert the selected guide-tube into the associated storage-compartment.

* * * * *